United States Patent [19]

Shimizume et al.

[11] Patent Number: 5,210,727
[45] Date of Patent: May 11, 1993

[54] COMPACT DISK PLAYERS

[75] Inventors: Kazutoshi Shimizume, Kanagawa; Junichi Aramaki, Chiba, both of Japan

[73] Assignee: Sony Corporation, Tokyo, Japan

[21] Appl. No.: 664,630

[22] Filed: Mar. 4, 1991

[30] Foreign Application Priority Data

Mar. 7, 1990 [JP] Japan .................................. 2-055525

[51] Int. Cl.$^5$ ............................................... G11B 7/00
[52] U.S. Cl. ........................................ 369/32; 369/54;
369/58; 369/59
[58] Field of Search ..................... 369/32, 59, 54, 58,
369/124

[56] References Cited
U.S. PATENT DOCUMENTS

| 4,587,643 | 5/1986 | Marinus et al. | 369/32 |
| 4,631,714 | 12/1986 | Kahlman et al. | 369/32 |
| 4,641,295 | 2/1987 | Furukawa et al. | 369/32 |
| 5,134,607 | 7/1992 | Fuji et al. | 369/32 |

FOREIGN PATENT DOCUMENTS

| 0255918A2 | 2/1988 | European Pat. Off. |
| 0283304A2 | 9/1988 | European Pat. Off. |
| 0363186A2 | 4/1990 | European Pat. Off. |

Primary Examiner—Robert J. Pascal
Assistant Examiner—Tan Dinh
Attorney, Agent, or Firm—Limbach & Limbach

[57] ABSTRACT

In a compact disk player, a demodulator (2) demodulates signals picked up from a disk, an error detection circuit (8) corrects the demodulated data, and an interpolation circuit (10, 12, 14, 16) interpolates output data from the error detection correction circuit according to a result of the error correction. A level setting circuit (10, 12, 16) sets to zero the level of data which has not been error corrected in a peak search, according to the error correction result, and a peak level detection circuit (20, 22, 24, 26) detects a peak level of digital audio signals outputted by the level setting circuit.

6 Claims, 4 Drawing Sheets

COMPACT DISK PLAYERS

BACKGROUND OF THE INVENTION

1. Field of the Invention

This invention relates to compact disk players' and is more particularly concerned with compact disk players provided with a peak search facility or function for use, for example, in the dubbing of data from a compact disk to another recording device.

2. Description of the Prior Art

Compact disk (CD) players, which can reproduce data (for example audio data) recorded on compact disks, are of course well known. It has been proposed that a CD player be capable of conducting a peak search. That is, the player is provided with means for detecting a peak signal level. The detected peak level may, for example, be used to facilitate setting of a recording level when dubbing from a compact disk to a tape recorder or the like is performed. More specifically, in the peak search mode, track jumps are repeatedly carried out, for example over every 10 tracks, and an audio signal is reproduced for each of the track jumps for a predetermined time interval. Every time an audio signal is reproduced, the peak level thereof is detected. Thus, the position of the track where the signal with the largest sound volume or level is recorded is approximately detected.

The above-described previously proposed CD player demodulates and temporarily stores regenerated (picked up) signals in a memory circuit, and the CD player then outputs the signals after subjecting them to error correction.

For this reason, as shown in FIG. 1 of the accompanying drawings, audio signals $S_{OUT}$ (FIG. 1(B)) are outputted by the CD player until a time $t_1$, when all the regenerated signals which have been stored in the memory circuit are outputted, even if the level of a track jump signal $S_J$ (FIG. 1(A)) rises at a time $t_0$ to start a track jump. After the time $t_1$, regenerated signals obtained during the track jump are processed and then outputted.

Accordingly, during a time interval $T_1$ immediately after the track jump, resetting of a peak level detection circuit (not shown) for detecting the peak level initiate detection of the peak level of pretrack jump audio signals $S_{OUT}$ being started.

Stable tracking control is not possible immediately after the track jump and thus the occurrence of errors cannot be avoided. For this reason, post-track jump audio signals $S_{OUT}$ are outputted after the elapsing of a time interval $T_2$ starting at the time $t_1$, the time interval $T_2$ being longer than the time interval (duration) $T_J$ of the actual track jump.

During the time interval $T_2$, the signal level of the audio signals $S_{OUT}$ is held according to the result of the error detection. Thus, the signal level at the time $t_1$ is held.

Thus, when a reset signal RST (FIG. 1(C)) is supplied to the peak level detection circuit during the time interval $T_2$, this initiates in detection of the peak level of the pre-track jump audio signals $S_{OUT}$.

Accordingly, until a time $t_3$ at which tracking control becomes stable after the track jump, and when post-track jump audio signals $S_{OUT}$ are outputted, it is not possible to start correct detection of the peak level of the audio signals $S_{OUT}$.

Thus, in a peak search operation, as shown in FIG. 2 of the accompanying drawings, in which peak level detection is performed twice for each track jump and in which an average value of the detection results is detected, an erroneous peak search result can be obtained.

More specifically, after a detection result of the peak level detection circuit is read, the peak level detection circuit is reset by raising the level of the reset signal RST (FIG. 2(A)), and then a track jump is carried out by raising the level of (pulsing) the track jump signal $S_J$ (FIG. 2(B)).

Furthermore, after the track jump signal $S_J$ rises, the detection result of the peak level detection circuit is received after a predetermined time interval $T_4$, and the reset signal RST rises again.

In a case where an average value is obtained by reading in peak level detection results twice for every track jump in this manner, during a time interval between a time $t_5$ and a time $t_6$ (FIG. 2(C)), at which times the reset signal RST is pulsed again, the pre-held peak level can be higher than a post-track jump peak level and hence the pre-track jump peak level $L_{2A}$ is detected. On the other hand during the time interval between the time $t_6$ and a time $t_7$, a peak level $L_{2B}$ is detected.

Acoordingly, during the time interval between the time $t_5$ and the time $t_7$, the peak level of a first recording track A is detected, but an average value of the peak levels $L_{2A}$ and $L_{2B}$ is detected. Thus, this results in an erroneous detection result.

On the contrary, during the time interval between the time $t_7$ and a time $t_8$, the pre-held level is lower than the post-track jump peak level, and hence a post-track jump peak level $L_{3A}$ is detected. On the other hand, during the time interval between the time $t_8$ and a time $t_9$, a post-track jump peak level $L_{3B}$ is detected.

Thus, during the time interval between the time $t_7$ and the time $t_9$, the peak level of a second recording track B is correctly detected.

For these reasons, the previously proposed CD player involves a problem in that although a post-track jump peak level can be correctly detected, a pre-track jump peak level can be erroneously detected.

To solve this problem, detection of a peak level could be started immediately after the time $t_3$ after which post-track jump audio signals $S_{OUT}$ are outputted. That is, after a peak level detection result is read at the time $t_3$, the reset signal RST would be caused to rise.

However, it is unavoidable that the time interval $T_3$, namely the interval from the time $t_0$ of the start of the track jump to the time $t_3$ of outputting the post-track jump audio signals $S_{OUT}$ (FIG. 1), changes according to the track jump amount, characteristics of the tracking control circuit, the timing of the start of the track jump and, other factors.

To obtain, in practice, a correct peak search result, it is not possible to output a reset signal RST until a sufficient time interval has elapsed after the track jump signal $S_J$ has returned to its low level to terminate the track jump. This raises a problem of a considerable time of time being required for carrying out the peak search.

An object of the invention is to provide a CD player which overcomes the disadvantages set out above.

Another object of the invention is to provide a CD player which can accurately and swiftly detect peak levels on a compact disk.

A further object of the invention is to provide a CD player which is capable of reducing the time necessary for carrying out a peak search by effectively avoiding errors in the peak search.

SUMMARY OF THE INVENTION

The present invention overcomes the problems set out above, and achieves the above objects, by providing a CD player which has a demodulation circuit for demodulating signals outputted by a pickup to provide demodulated data, an error detection correction circuit for correcting the demodulated data, an interpolation circuit for interpolating data outputted by the error detection correction circuit according to an error correction result of the error detection correction circuit to produce digital audio signals, a level setting circuit for setting the signal level of data, which has not been error corrected in a peak search, to a zero level, according to the error correction result of the error detection correction circuit, so as thereby to output the digital audio signals, and a peak level detection circuit for detecting a peak level of the digital audio signals outputted from the level setting circuit.

Detection of a peak level, with the signal level of data which has not been error corrected set to a zero level, enables erroneous detection of the peak level to be effectively avoided even if the track jump cycle is shortened. Thus, the time required for performing the peak search operation is shortened, while errors in the peak search are effectively avoided.

In other words in the CD player according to the present invention, data which has not been error corrected during a peak search is set to zero signal level, whereby the time required for the peak search is shortened by effectively avoiding errors in the peak search.

BRIEF DESCRIPTION OF THE DRAWINGS

The above and other objects, features and advantages of the invention will be apparent from the following detailed description of illustrative embodiments, which is to be read in conjunction with the accompanying drawings, in which the references designate like items throughout, and in which.

DESCRIPTION OF THE PREFERRED EMBODIMENTS

Figure 3:
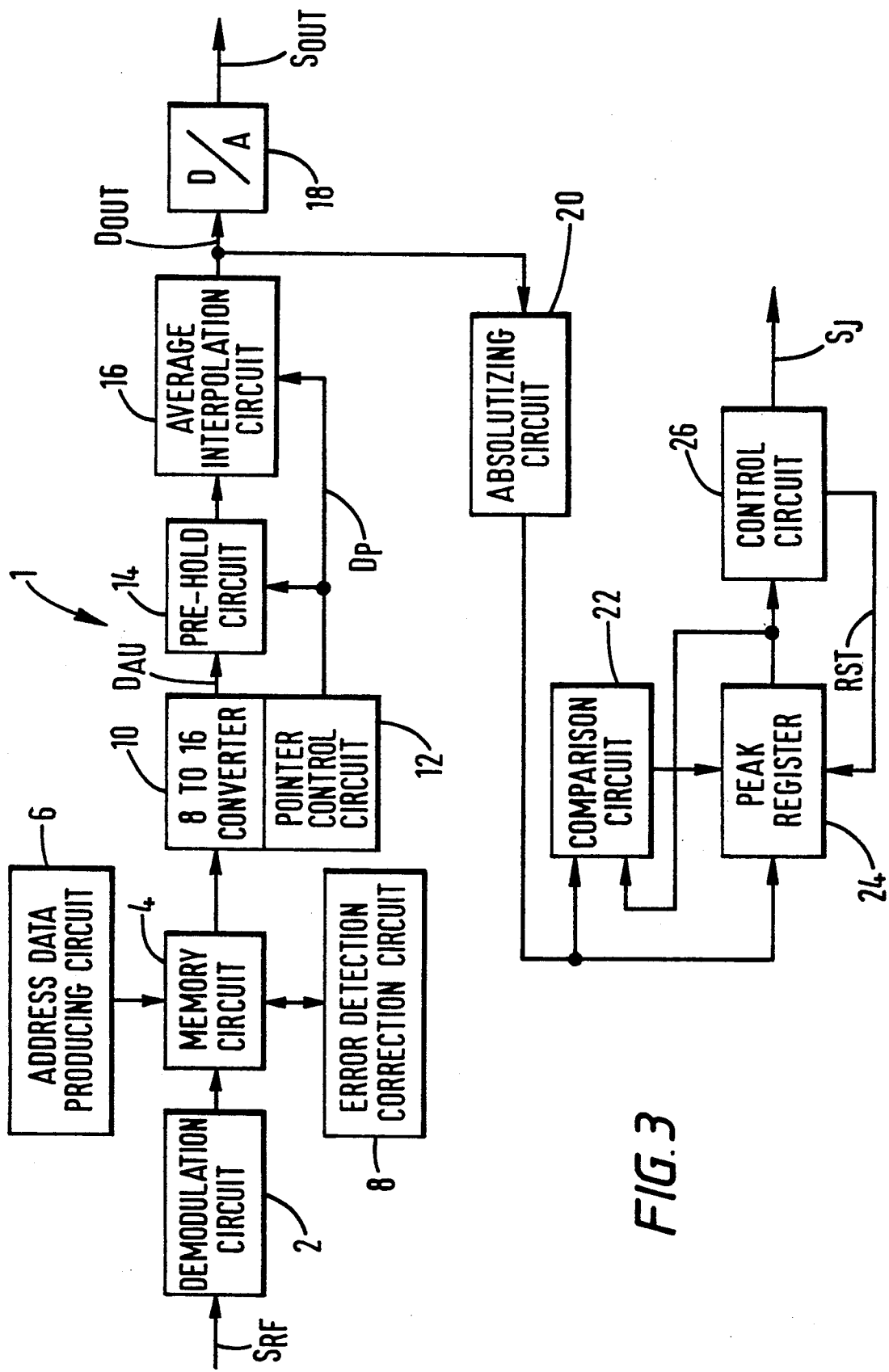
FIG. 3 is a block diagram of a CD player according to a preferred embodiment of the invention.

FIG. 3 shows a compact disk player 1 in which regenerated (picked up) digital signals $S_{RF}$ reproduced from a compact disk (not shown) by a pickup (not shown) of the plater are demodulated in a demodulation circuit 2 and the resultant demodulated data are stored in a memory circuit 4.

After outputting the demodulated data to an error detection correction circuit 8 according to address data outputted by an address data producing circuit 6, the memory circuit 4 stores the demodulated data process in the error detection correction circuit 8, together with an error correction result, and sequentially outputs them to an 8- to-16 converter 10 and a pointer control circuit 12.

The error detection correction circuit 8 error corrects the demodulated data according to an error detection correction code added to the demodulated data, and then outputs it to the memory circuit 4. In this case, error uncorrected demodulated data is outputted to the memory circuit 4 together with a predetermined flag indicating that correction has not been offered.

The 8-to-16 converter 10 transforms an array of the output data of the memory circuit 4, so that 8 bit output data is transformed to 16 bit digital audio signals $D_{AU}$.

The pointer control circuit 12 accepts the flag of the error correction result from the memory circuit 4 and raises the pointer $D_p$ at the timing of outputting error uncorrected digital audio signals $D_{AU}$ from the 8-to-16 converter 10.

When the pointer $D_p$ rises, a pre-hold circuit 14 outputs, as a pre-hold level, a signal level of the digital audio signals $D_{AU}$ outputted from the 8-to-16 converter 10.

Also, when the pointer $D_p$ rises, an average interpolation circuit 16 interpolates (by averaging) the digital audio signals $D_{AU}$ outputted from the pre-hold circuit 14 in an ordinary operation condition, and outputs the resultant digital audio signals $D_{OUT}$ as digital output signals $S_{OUT}$ via a digital-to-analog converter 18. This enables generation of unusual noises effectively to be avoided even when, for example, a dropout which is too large to be correctable takes place.

On the other hand, during a peak search the average interpolation circuit 16 allows the signal level of the digital audio signals $D_{AU}$, outputted from the pre-hold circuit 14, to fall to a zero level when the pointer $D_p$ rises.

Figure 1:
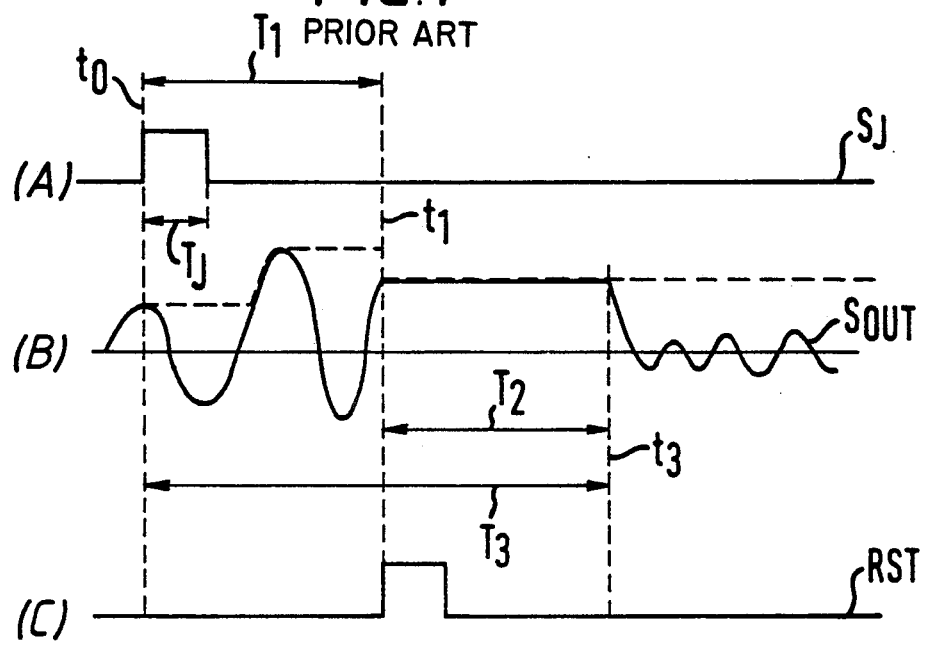
FIG. 1 shows waveforms relating to a peak level detection operation carried out in the previously proposed CD player mentioned above.
Figure 4:
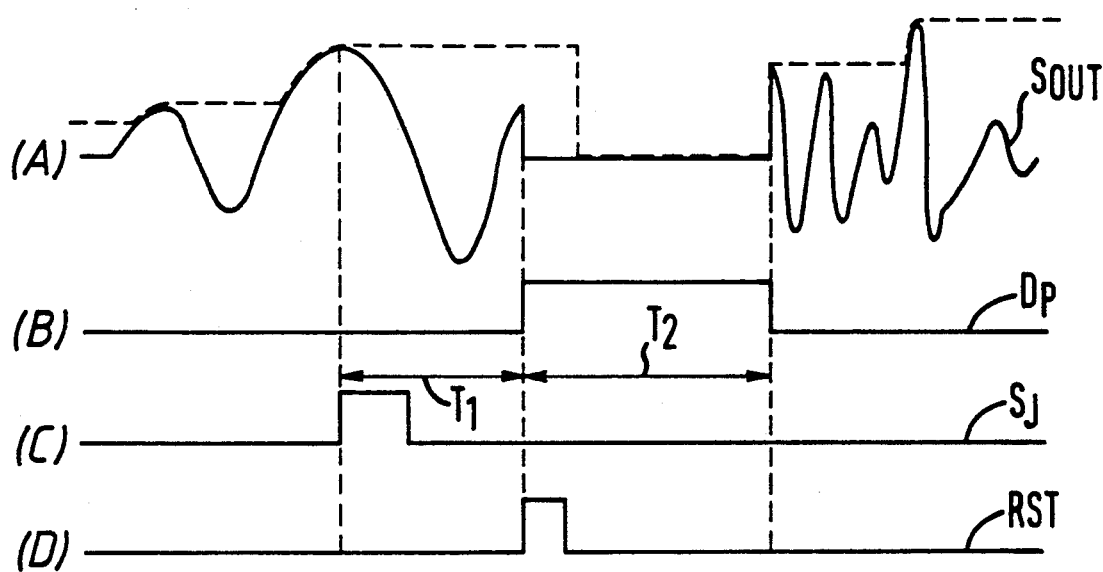
FIG. 4 shows waveforms relating to a peak level detection operation carried out in the CD player of FIG. 3.
Figure 2:
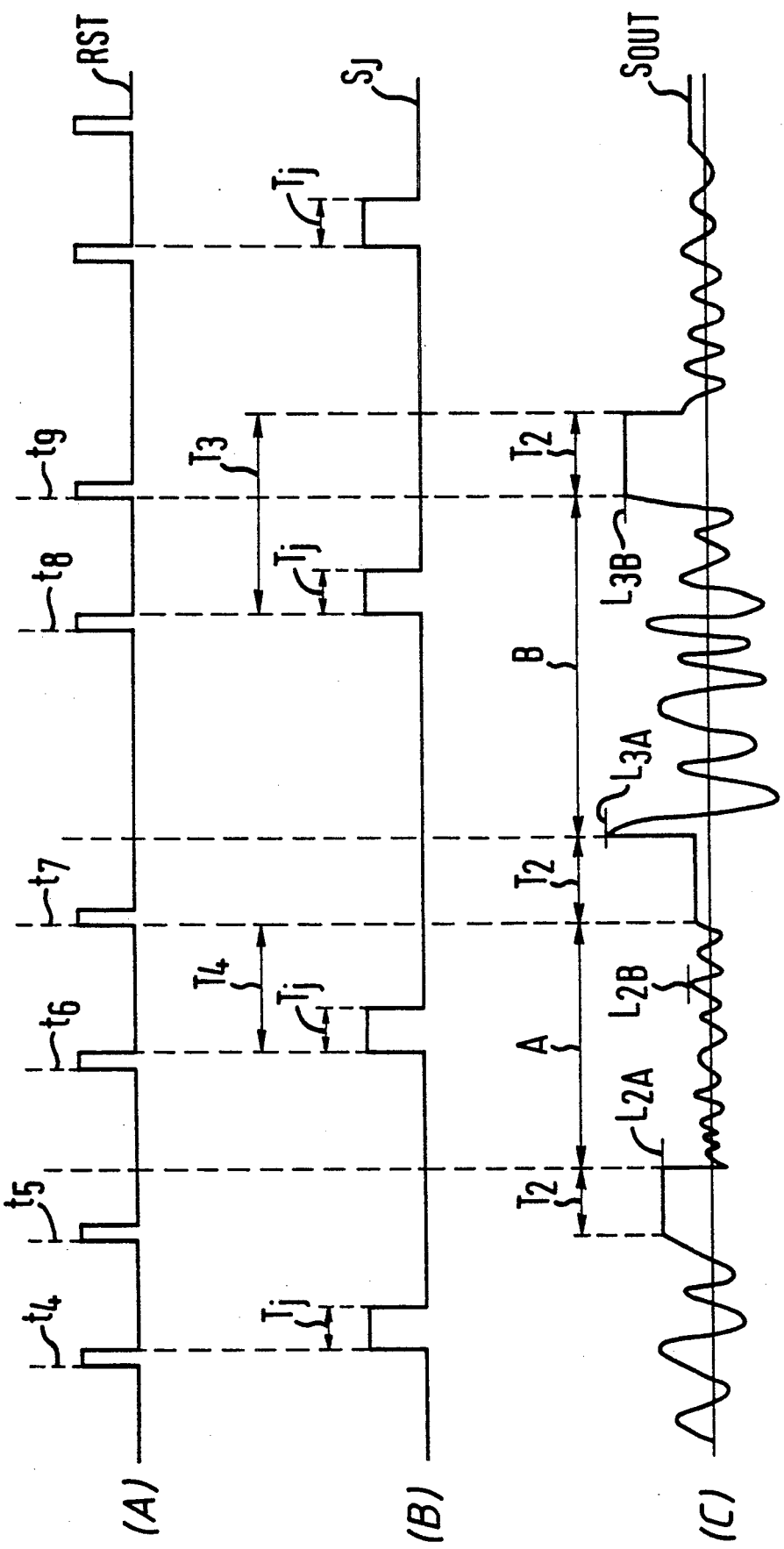
FIG. 2 shows waveforms relating to a peak search operation carried out in the previously proposed CD player.

As shown in FIG. 4, the pointer $D_p$ (FIG. 4(B)) thus rises, during the time interval $T_2$ in which uncorrected digital audio signals $D_{OUT}$ (corresponding to analog signal $S_{OUT}$ of FIG. 4(A)) are outputted, and in response the signal level of the digital audio signals $D_{OUT}$ falls to zero.

Thus, when a reset signal RST (FIG. 4(D)) has been output immediately after the completion of the output of the pre-track jump digital audio signals $D_{OUT}$ in a predetermined time period from the rise of the track jump signal $S_J$ (FIG. 4(C)), the digital audio signals $D_{OUT}$ being held at a zero level are subjected to peak level detection. This enables peak level detection of the digital audio signals $D_{OUT}$ effectively to be avoided.

In practice, digital audio signals are recorded on the compact disk in an interleave cycle. Hence, it is generally possible to predict the maximum value during a time interval $T_1$ in which pre-track jump demodulated data stored in the memory circuit 4 are completely outputted after the track jump signal $S_J$ rises.

Thus, a correct peak search result can be obtained, even if the track jump cycle is shortened, by setting up the player so that resetting is carried out by reading in the result (shown by the broken line in FIG. 4(A)) of the detection carried out by the peak level detection circuit after the time interval $T_1$.

More specifically, as shown in FIG. 3, an absolutizing circuit 20 receives the digital audio signals $D_{OUT}$ and outputs absolute values of the signal levels thereof to a comparison circuit 22 and a peak register circuit 24.

The comparison circuit 22 outputs a signal indicative of the result of comparing the absolute value stored in the peak register circuit 24 and an absolute value subsequently inputted, whereby the contents of the peak register circuit 24 are renewed to store data of the peak level therein.

The peak register circuit 24 is initialized by the reset signal RST outputted from a control circuit 26 and outputs data to the control circuit 26.

Figure 5:
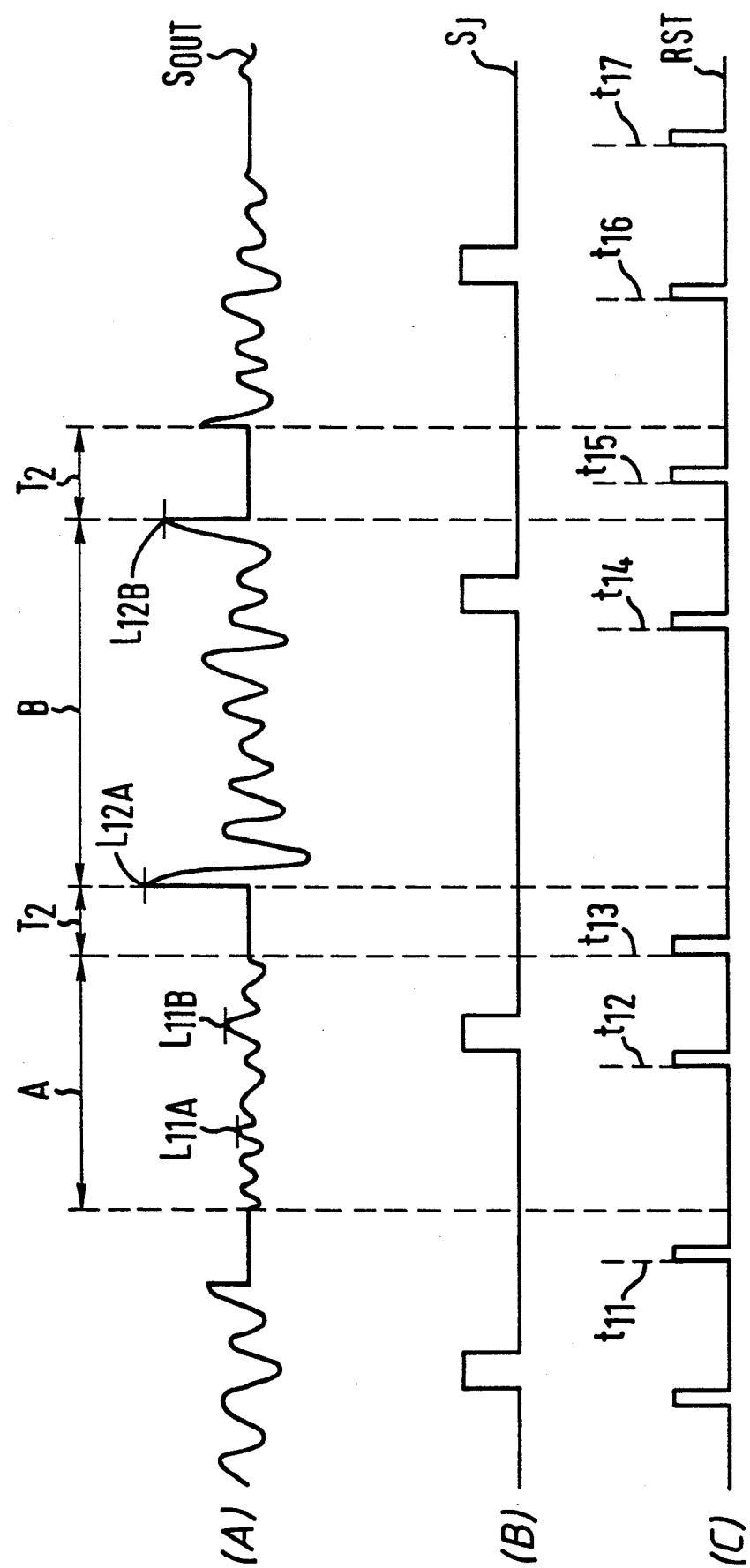
FIG. 5 shows waveforms relating to a peak search operation carried out in the CD player of FIG. 3.

The control circuit 26 outputs the track jump signal $S_J$ (FIG. 5(B)) in a predetermined cycle in the peak search, and in this event pulses of the reset signal RST (FIG. 5(C)) are outputted immediately before outputting of pulses of the track jump signal $S_J$ and after reading in of the output data from the peak register circuit 24.

Furthermore, after the time interval $T_1$, output data from the peak register circuit 24 is received and then another reset signal RST is outputted.

Accordingly, a post-track jump peak level L11A is detected during a time interval extending from a time $t_{11}$ to a time $t_{12}$ (times of commencement or rising of pulses of the reset signal), whereas a subsequent peak level L11B is correctly detected during another time interval from the time $t_{12}$ to a time $t_{13}$.

Similarly, a subsequent post-track jump peak level L12A is detected during a time period from the time $t_{13}$ to a time $t_{14}$, while a subsequent peak level L12B is correctly detected during a time period from the time $t_{14}$ to a time $t_{15}$.

The control circuit 26 obtains average values of the peak levels L11A and L11B, L12A and L12B, ... in the track jump cycle and then sequentially produces comparison results. The control circuit 26 detects a track position where the maximum average value is provided and displays the detection result.

Thus, immediately after the track jumps, correct post-track jump peak levels can be detected. This enables peak search errors to be effectively avoided even if the track jump cycle is shortened, so that the time required for the peak search is reduced.

In the present embodiment, the demodulation circuit 2 constitutes a demodulation circuit which demodulated the regenerated signals $S_{RF}$ outputted by the pickup and outputs the resultant demodulated data, and the error detection correction circuit 8 constitutes an error detection correction circuit for error correcting the demodulated data.

Furthermore, the 8-to-16 converter 10, the pointer control circuit 12, the pre-hold circuit 14 and the average interpolating circuit 16 constitute an interpolation circuit which outputs digital audio signals $D_{OUT}$ by interpolating output data ($D_{AU}$) of the error detection correction circuit 8 according to the error correction result from the error detection correction circuit 8. The 8-to-16 converter 10, the pointer control circuit 12 and the average interpolating circuit 16 constitute a level setting circuit which sets the signal level of data $D_{OUT}$ which have not been error corrected in a peak search to zero, according to the result of error correction from the error detection correction circuit 8, so as thereby to output digital audio signals $D_{OUT}$. The absolutizing circuit 20, the comparison circuit 22, the peak register circuit 24 and the control circuit 26 constitute a peak level detection circuit which detects peak levels of the digital audio signals $D_{OUT}$ outputted from the level setting circuit.

With the above-described construction, after demodulation in track jumps, the picked up signals $S_{RF}$ are error corrected in the error detection correction circuit 8 and then stored in the memory circuit 4 together with the error correction result.

The data stored in the memory circuit 4 are sequentially outputted to the 8-to-16 converter 10, pre-hold circuit 14 and average interpolating circuit 16, where the digital audio signals $D_{OUT}$ which have not been error corrected are held to a zero level according to the error correction result.

Absolute values of the signal levels of the digital audio signals $D_{OUT}$ are obtained in the absolutizing circuit 20, and the maximum value of each of the absolute values is then sequentially detected in the comparison circuit 22 and the peak register circuit 24.

In this manner, peak levels are detected. Also, the digital audio signals $D_{OUT}$ which have not been error corrected are held to zero signal level. Thus, the post-track jump peak levels can be correctly detected even if the peak levels are detected immediately after track jumps.

Thus, errors in the peak search results can be effectively avoided even if the time needed for each peak search is shortened by reducing the track jump cycle in such a manner.

Although in the above-described embodiment two detected peak levels are averaged, the invention is not limited thereto. The invention may be applied more widely, such as to a case in which a plurality of detected peak levels are obtained and a case where the averaging processing is omitted.

Furthermore, the periods during which the digital audio signals $D_{OUT}$ are maintained at zero signal level may be detected and the results may be used as discrimination signals between tracks.

In the above-described embodiment, the digital audio signals $D_{OUT}$ which have not been error corrected and held to a zero signal level in the average interpolating circuit 16. However, the present invention is not limited thereto, in that a separate level setting circuit may be provided to maintain the signal levels at zero.

According to the above-described embodiments of the invention, digital audio signals which have not been error corrected are held to a zero signal level in peak searches, whereby errors in peak search results can effectively be avoided even if the cycle of the track jump is shortened. Thus, the embodiments each provide a CD player which is capable of reducing the time required for peak searching while effectively avoiding errors in the peak search.

In summary, the previously proposed CD player (with error correction and peak detection) is subject to the disadvantages that an erroneous (bad) signal level can be held in the case of bad data, for example data produced during a track jump. This held value may be higher than any proper level in the next peak detection time slot or window and can therefore be taken as a peak at the beginning of the next time slot. The above-described embodiments of the invention solve this problem by zeroing the output signal level in the case of bad data, as indicated by a bad data flag resulting from the error correction process.

Although illustrative embodiments of the invention have been described in detail herein with references to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A compact disk player comprising:
 a demodulation circuit for demodulating a signal outputted from a pickup to produce demodulated data;
 an error detection correction circuit for error correcting said demodulated data to produce output data;
 an interpolation circuit for interpolating said output data from said error detection correction circuit according to a result of said error correction effected by said error detection correction circuit to thereby output a digital audio signal;
 a level setting circuit for setting a signal level of data, which has not been error corrected in a peak search, to a zero level, according to said error correction result of said error detection correction circuit, and outputting said digital audio signal; and
 a peak level detection circuit for detecting a peak level of said digital audio signal outputted by said level setting circuit.

2. A compact disk player according to claim 1, wherein said peak level detection circuit comprises:
 an absolutizing circuit connected to receive said digital audio signal outputted by said level setting circuit and operative to output absolute values of the levels of said signal;
 a comparison circuit having first and second inputs, said first input being connected to receive said absolute values;
 a peak register circuit connected to receive said absolute values and to receive a reset signal that will reset said peak register, said peak register being operative to store a peak value of said absolute values; and
 a control circuit operative to produce said reset signal and to produce a track jump signal that causes the player to jump over a predetermined number of tracks;
 an input of said control circuit and said second input of said comparison circuit both being connected to receive said peak value stored by said peak register circuit, and said comparison circuit being operative to compare said peak value stored by said peak register and subsequent absolute values and to apply a signal indicative of the result of said comparison to said peak register circuit to cause renewed storage of peak level data in the peak register circuit, whereby a peak level is detected between each successive pair of occasions when said peak register is reset.

3. A compact disk player according to claim 1, including means for averaging pairs of peak levels detected by said peak level detection circuit.

4. A compact disk player comprising:
 a demodulation circuit for demodulating signals reproduced from a compact disk to produce demodulated data;
 an error detection correction circuit operative to error correct said demodulated data and to produce a predetermined flag in the case of data not subjected to error correction;
 a level setting circuit responsive to said flag to set a signal level of data which has not been error corrected in a peak search, to a zero level and operative to output digital audio signals; and
 a peak level detection circuit for detecting a peak level of said digital audio signals outputted by said level setting circuit.

5. A compact disk player according to claim 4, wherein said peak level detection circuit comprises:
 an absolutizing circuit connected to receive said digital audio signal outputted by said level setting circuit and operative to output absolute values of the levels of said signal;
 a comparison circuit having first and second inputs, said first input being connected to receive said absolute values;
 a peak register circuit connected to receive said absolute values and to receive a reset signal that will reset said peak register, said peak register being operative to store a peak value of said absolute values; and
 a control circuit operative to produce said reset signal and to produce a track jump signal that causes the player to jump over a predetermined number of tracks;
 an input of said control circuit and said second input of said comparison circuit both being connected to receive said peak value stored by said peak register circuit, and said comparison circuit being operative to compare said peak value stored by said peak register and subsequent absolute values and to apply a signal indicative of the result of said comparison to said peak register circuit to cause renewed storage of peak level data in the peak register circuit, whereby a peak level is detected between each successive pair of occasions when said peak register is reset.

6. A compact disk player according to claim 4, including means for averaging pairs of peak levels detected by said peak level detection circuit.

* * * * *